(12) United States Patent
Fukushima

(10) Patent No.: US 11,606,047 B2
(45) Date of Patent: Mar. 14, 2023

(54) CONTROL DEVICE, CONTROL SYSTEM, AND MACHINE LEARNING DEVICE

(71) Applicant: FANUC Corporation, Yamanashi (JP)

(72) Inventor: Yuusuke Fukushima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 310 days.

(21) Appl. No.: 16/902,810

(22) Filed: Jun. 16, 2020

(65) Prior Publication Data

US 2020/0403539 A1 Dec. 24, 2020

(30) Foreign Application Priority Data

Jun. 21, 2019 (JP) .............................. JP2019-115896

(51) Int. Cl.
| | |
|---|---|
| *H02P 5/74* | (2006.01) |
| *H02P 6/00* | (2016.01) |
| *H02P 3/14* | (2006.01) |
| *G06N 3/04* | (2023.01) |

(52) U.S. Cl.
CPC ............... *H02P 6/005* (2013.01); *G06N 3/04* (2013.01); *H02P 3/14* (2013.01)

(58) Field of Classification Search
CPC .... H02P 6/005; H02P 3/14; H02P 5/74; H02P 23/0031; G06N 3/04
See application file for complete search history.

(56) References Cited

U.S. PATENT DOCUMENTS

| | | | | |
|---|---|---|---|---|
| 6,291,959 B1 * | 9/2001 | Yoshida | ............... | G05B 19/404 318/567 |
| 10,564,620 B2 | 2/2020 | Ikai et al. | | |
| 2004/0232870 A1 * | 11/2004 | Mizukami | .............. | G05B 19/19 318/625 |
| 2008/0234869 A1 * | 9/2008 | Yonezawa | ................ | F24F 11/30 236/49.3 |
| 2015/0134583 A1 * | 5/2015 | Tamatsu | .................... | G06N 3/08 706/25 |
| 2017/0028521 A1 * | 2/2017 | Yamamoto | ............ | B25B 23/147 |
| 2017/0090434 A1 * | 3/2017 | Katsuki | .............. | G05B 13/0265 |
| 2017/0138727 A1 * | 5/2017 | Tomita | .................. | G05B 19/18 |
| 2017/0261967 A1 * | 9/2017 | Shimura | .......... | G05B 19/41865 |
| 2017/0300041 A1 * | 10/2017 | Onishi | ............... | G05B 19/4065 |
| 2018/0267499 A1 * | 9/2018 | Tsuneki | ................ | G06N 20/00 |
| 2018/0267502 A1 * | 9/2018 | Ikai | ...................... | G05B 19/404 |
| 2019/0005413 A1 * | 1/2019 | Sato | ....................... | G06N 20/00 |
| 2019/0275629 A1 * | 9/2019 | Ogawa | ................. | G05B 19/406 |

FOREIGN PATENT DOCUMENTS

| | | |
|---|---|---|
| JP | 2017162300 A | 9/2017 |
| JP | 2018153041 A | 9/2018 |

* cited by examiner

*Primary Examiner* — Muhammad S Islam
(74) *Attorney, Agent, or Firm* — RatnerPrestia

(57) ABSTRACT

A control device according to the present invention is provided with a data acquisition unit configured to acquire data on at least an operating state of an industrial machine, a learning model storage unit configured to store a learning model in which the value of a setting action for a base speed of a servomotor for peak cut is associated with the operating state of the industrial machine, and a decision making unit configured to settle the setting action for the base speed of the servomotor for peak cut based on the data on the operating state of the industrial machine acquired by the data acquisition unit, by using the learning model stored in the learning model storage unit.

8 Claims, 7 Drawing Sheets

CONTROL DEVICE, CONTROL SYSTEM, AND MACHINE LEARNING DEVICE

BACKGROUND OF THE INVENTION

Related Applications

The present application claims priority to Japanese Patent Application Number 2019-115896 filed Jun. 21, 2019, the disclosure of which is hereby incorporated by reference herein in its entirety.

Field of the Invention

The present invention relates to a control device, control system, and machine learning device.

Description of the Related Art

A plurality of industrial machines, such as machine tools, injection molding machines, and robots, installed in a factory or some other manufacturing site are operating based on commands from individual control devices for controlling the industrial machines. These industrial machines are connected to predetermined power supply equipment and consume electric power therefrom as it operates (e.g., Japanese Patent Application Laid-Open No. 2017-162300). If a command for high power consumption is executed by the industrial machines as this is done, high electric power is consumed in the industrial machines. In order to reduce the amount of power consumption in such a case, the power consumption is suppressed by driving a motor different from drive motors of the industrial machines in advance and decelerating the different motor at the timing of the power consumption in the industrial machines, thereby generating regenerative energy, as shown in FIG. 7, for example. The different or alternative motor installed for this purpose is called a motor for peak cut herein.

As described above, the motor for peak cut is expected to be decelerated to generate regenerative energy at the timing of the power consumption in the industrial machines, so that it should usually be rotating at a predetermined specified speed (base speed). This base speed is settled with reference to, for example, operation patterns of the drive motors of the industrial machines and the like, based on the experience of an on-site worker. The base speed tends to be set a little too high lest the motor speed of the motor for peak cut be reduced too much when the motor is decelerated to generate the regenerative energy.

If the base speed of the motor for peak cut is settled when the power consumption in the industrial machines is highest, e.g., when the outputs of the drive motors of the industrial machines are highest, the motor for peak cut is kept rotating at a high speed even when the outputs of the drive motors of the industrial machines are not high. However, if the base speed of the motor for peak cut is uniformly set somewhat high, problems arise that power losses in the motor for peak cut increase and the life of bearings of the motor is shortened due to an increase in iron losses or the like.

Accordingly, there is a demand for a method for learning and setting an appropriate base speed of a motor for peak cut in accordance with the operating states of industrial machines.

SUMMARY OF THE INVENTION

A control device according to one aspect of the present invention solves the above problems by learning an appropriate base speed of a motor for peak cut in each state of industrial machines by trial and error, based on data on outputs of the industrial machines, and adjusting the base speed based on the result of the learning.

The one aspect of the present invention is a control device configured to control a peak-cut operation of a motor for peak cut connected to one and the same power supply path with at least one industrial machine, and comprises a data acquisition unit configured to acquire data on at least an operating state of the industrial machine, a learning model storage unit configured to store a learning model in which the value of a setting action for a base speed of the motor for peak cut is associated with the operating state of the industrial machine, and a decision making unit configured to settle the setting action for the base speed of the motor for peak cut based on the data on the operating state of the industrial machine acquired by the data acquisition unit, by using the learning model stored in the learning model storage unit.

Another aspect of the present invention is a control system in which a plurality of control devices are connected to one another, the control system being configured so that the result of learning by the learning unit is sharable by the control devices.

Another aspect of the present invention is a machine learning device having learned a setting action for a base speed of a motor for peak cut, connected to one and the same power supply path with at least one industrial machine, in control of a peak-cut operation of the motor for peak cut, the machine learning device comprising a learning model storage unit configured to store a learning model in which the value of a setting action for a base speed of the motor for peak cut is associated with an operating state of the industrial machine and a decision making unit configured to settle the setting action for the base speed of the motor for peak cut based on the data on the operating state of the industrial machine acquired by the data acquisition unit, by using the learning model stored in the learning model storage unit.

According to the one aspect of the present invention, the base speed of the motor for peak cut will not be increased too much, so that losses in the motor for peak cut can be expected to be reduced, and in addition, the life of bearings of the motor for peak cut be extended.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

Figure 1:
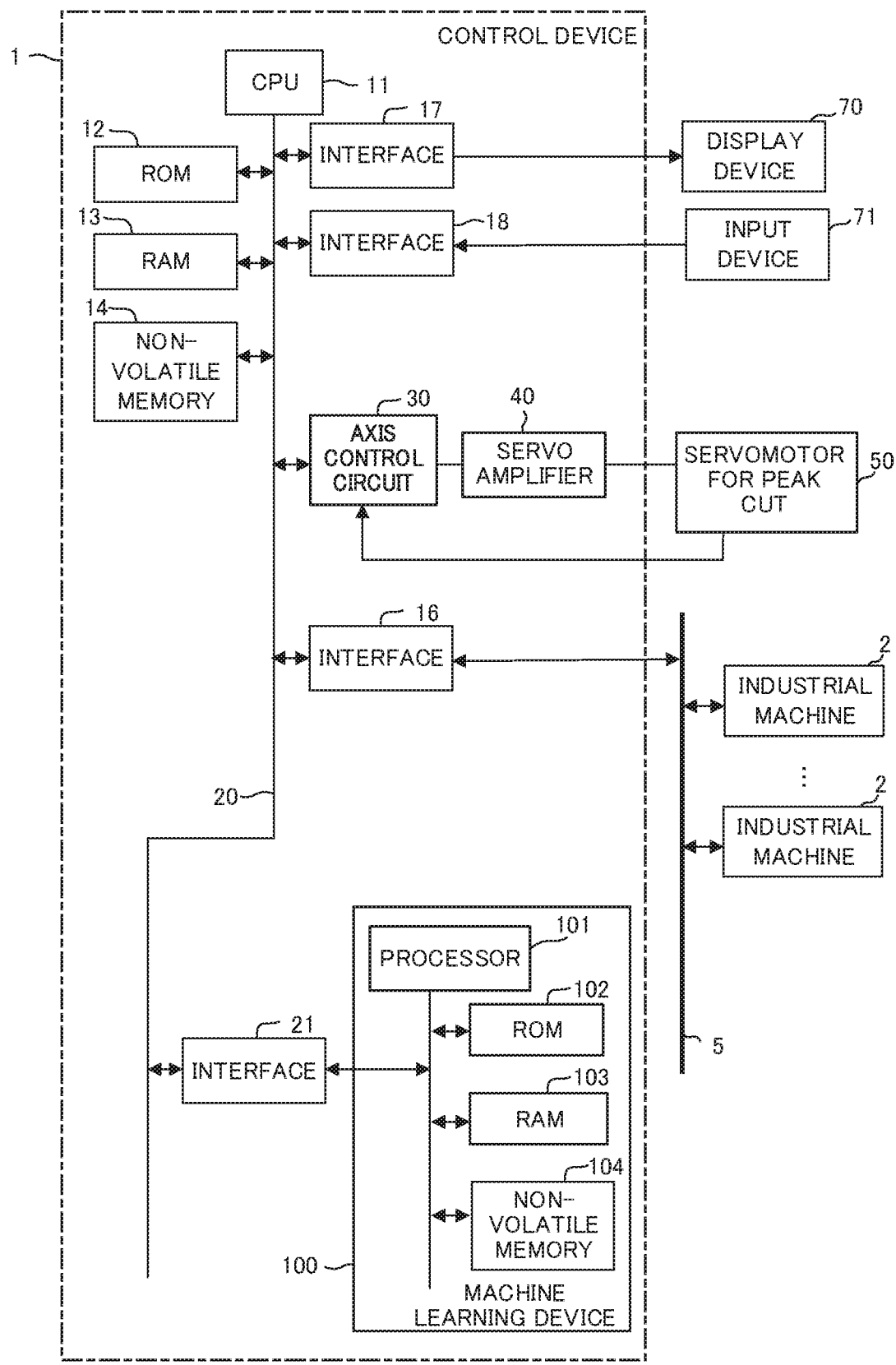
FIG. 1 is a schematic hardware configuration diagram of a control device according to one embodiment.

FIG. 1 is a schematic hardware configuration diagram showing principal parts of a control device according to one embodiment. A control device 1 of the present embodiment can be implemented as a control device for controlling a motor for peak cut. Also, the control device 1 can be implemented as a computer, such as a personal computer installed in a factory, a cell computer connected to a network in the factory, a fog computer, or a cloud server. In the illustrated example of the present embodiment, the control device 1 is implemented as a control device for controlling a motor for peak cut.

A CPU(Central Processing Unit) 11 of the control device 1 according to the present embodiment is a processor for generally controlling the control device 1. The CPU 11 reads out a system program stored in a ROM(Read Only Memory) 12 connected thereto via a bus 20 and controls the entire control device 1 according to this system program. A RAM (Random Access Memory) 13 is loaded with temporary calculation data, display data to be displayed on a display device 70, various data input through an input device 71 by a worker, and the like.

A non-volatile memory 14 is composed of, for example, a memory, SSD (solid state drive), or the like backed up by a battery (not shown) so that its storage state can be maintained even when the control device 1 is switched off. The non-volatile memory 14 is stored with a setting area loaded with setting information related to the operation of the control device 1 and data and control programs input from the input device 71 through an interface 18. The non-volatile memory 14 is further stored with various data (control programs being executed in industrial machines 2, output calculated values, output measured values, and motor speeds of drive motors of the industrial machines 2, etc.) acquired from the industrial machines 2 through a network 5, data and programs for control read through an external storage device (not shown), and the like. The programs and the various data stored in the non-volatile memory 14 may be developed in the RAM 13 during execution and use. Moreover, system programs including conventional analysis programs for analyzing the various data are previously written in the ROM 12.

The control device 1 is connected to the wired/wireless network 5 through an interface 16. The network 5 is connected with at least one of the industrial machines 2 connected to a power supply path for supplying power to the control device 1 so that data can be exchanged with the control device 1.

Data read onto the memory, data obtained as a result of execution of programs or the like, data output from a machine learning device 100 (described later), and the like are output to and displayed on the display device 70 through an interface 17. Moreover, the input device 71, which is composed of a keyboard, pointing device, and the like, delivers commands, data, and the like based on the worker's operation to the CPU 11 through the interface 18.

An axis control circuit 30 receives a movement command amount for each axis from the CPU 11 and outputs a command for the axis to a servo amplifier 40. On receiving this command, the servo amplifier 40 drives a servomotor 50 for peak cut. The servomotor 50 for peak cut has a position/speed detector built-in and feeds back a position/speed feedback signal from this position/speed detector to the axis control circuit 30, thereby performing position/speed feedback control.

An interface 21 connects the CPU 11 and the machine learning device 100. The machine learning device 100 comprises a processor 101 configured to control the entire machine learning device 100, a ROM 102 stored with system programs and the like, a RAM 103 for temporary storage in each step of processing related to machine learning, and a non-volatile memory 104 used to store learning models and the like. The machine learning device 100 can observe pieces of information (control programs being executed in the industrial machines 2, output calculated values, output measured values, and motor speeds of the drive motors of the industrial machines 2, etc.) that can be acquired by the control device 1 through the interface 21. Moreover, on receiving results output from the machine learning device 100, the control device 1 performs display on the display device 70, output of a command to the servomotor 50 for peak cut to be controlled, and the like.

Figure 2:
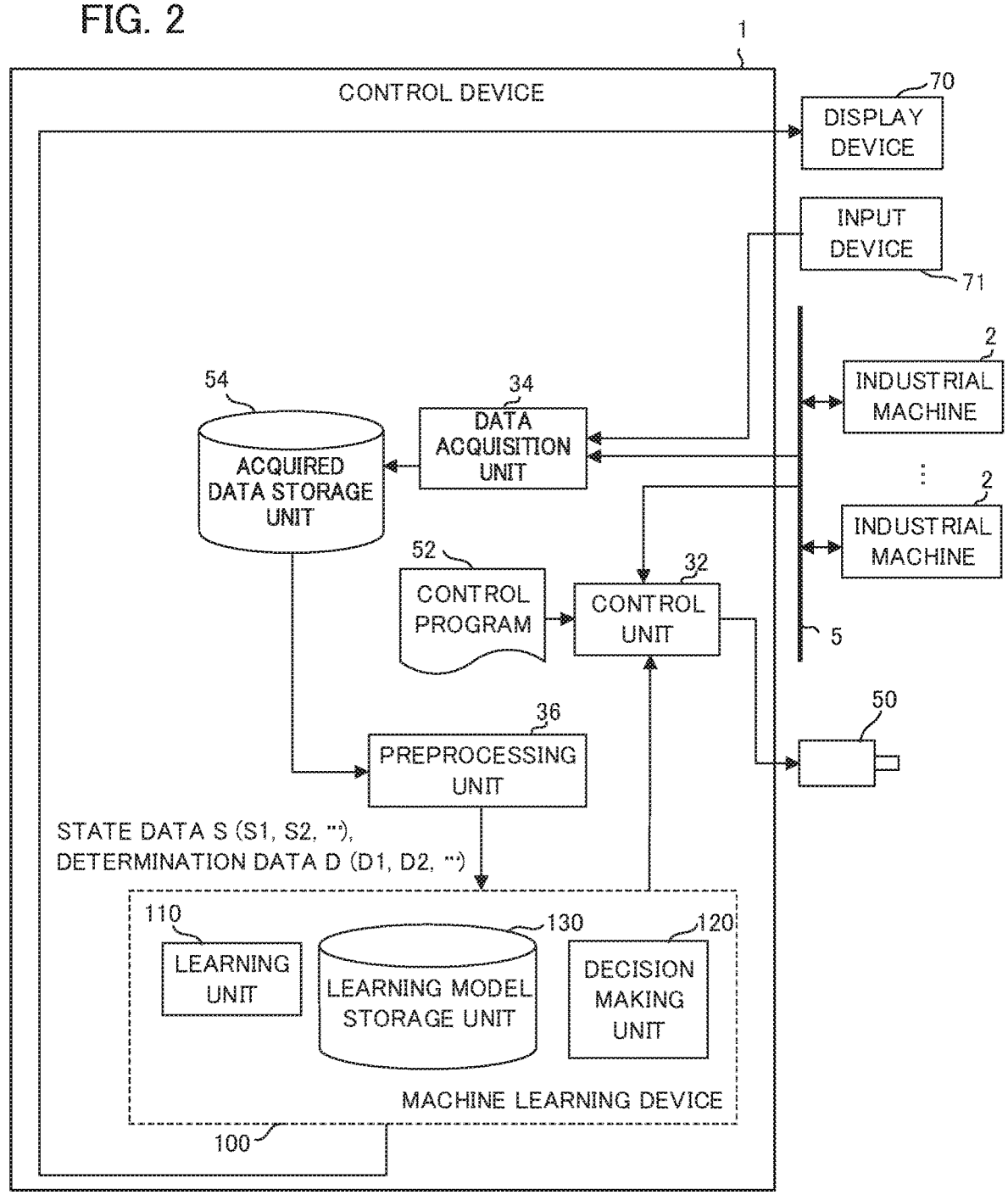
FIG. 2 is a schematic functional block diagram of a control device according to a first embodiment.

FIG. 2 is a schematic functional block diagram of a control device 1 and a machine learning device 100 according to a first embodiment. The control device 1 of the present embodiment has a configuration required when the machine learning device 100 performs learning and a configuration required for processing based on decision making by the machine learning device 100. Each functional block shown in FIG. 2 is constructed so that the CPU 11 of the control device 1 and the processor 101 of the machine learning device 100 shown in FIG. 1 execute their respective system programs and control the operation of each part of the control device 1 and the machine learning device 100.

The control device 1 of the present embodiment comprises a control unit 32, data acquisition unit 34, and preprocessing unit 36, and the machine learning device 100 of the control device 1 comprises a learning unit 110 and a decision making unit 120. Moreover, an acquired data storage unit 54 stored with data acquired from the industrial machines 2 and the like is provided on the non-volatile memory 14 shown in FIG. 1. A learning model storage unit 130 configured to store learning models constructed by machine learning by the learning unit 110 is provided on the non-volatile memory 104 of the machine learning device 100.

The control unit 32 is constructed so that the CPU 11 of the control device 1 shown in FIG. 1 executes a system program read out from the ROM 12 and arithmetic processing mainly by the CPU 11 using the RAM 13 and the non-volatile memory 14 and control processing of the axis control circuit 30 for the servomotor 50 for peak cut are performed. The control unit 32 controls the operation of the servomotor 50 for peak cut based on a control program 52 stored in the non-volatile memory 14 shown in FIG. 1. The control unit 32 has a function for generate control required in controlling the operation of each part of the industrial machines 2. For example, it outputs a movement command to the servomotor 50 for peak cut according to the control program 52 for each control period.

The control unit 32 controls the servomotor 50 for peak cut so as to drive it at a base speed set in the control program 52 or the setting area provided on the non-volatile memory 14 of the control device 1. Moreover, the control unit 32 acquires the operating states of the industrial machines 2 through a workpiece 5 and controls the servomotor 50 for peak cut so as to decelerate it in accordance with an increase, if any, of the amount of power consumption in the industrial machines 2, thereby generating regenerative energy.

Figure 3:
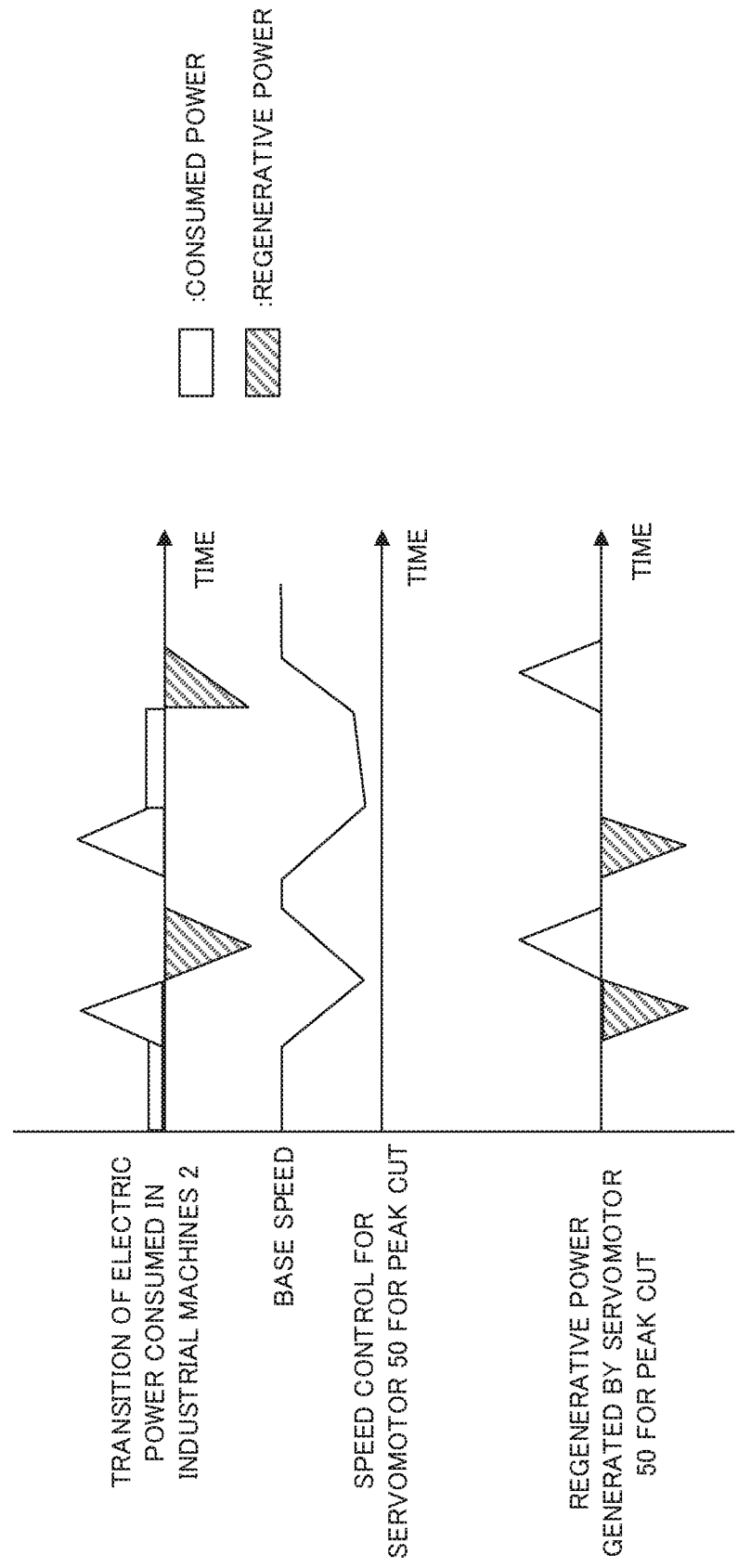
FIG. 3 is a diagram illustrating power consumption and power regeneration by an industrial machine.

FIG. 3 is a diagram schematically showing the relationship between the transition of electric power consumed in the industrial machines 2 and speed control of the servomotor 50 for peak cut. As shown in FIG. 3, the control unit 32 normally causes the servomotor 50 for peak cut to be driven at the set base speed. If the power consumed in the industrial machines 2 is increased, the control unit 32 generates regenerative power by decelerating the servomotor 50 for peak cut. Also, it accelerates the servomotor 50 for peak cut to the base speed at the timing of the generation of the regenerative power in the industrial machines 2 or the like.

While the amount of power consumption in the industrial machines 2 increases when the speeds of the drive motors of the industrial machines 2 are increased by a command executed mainly in the industrial machines 2, the increase of the power consumption in this case can be obtained by computation based on the accelerations of the drive motors or the like. Therefore, appropriate regenerative energy can be generated by estimating the amount of power consumption in the industrial machines 2 by sequentially acquiring the operating states of the industrial machines 2 and suitably decelerating the servomotor 50 for peak cut in accordance with the estimated amount. The increase of the power consumption in the industrial machines 2 may alternatively be acquired by being directly measured by means of sensors such as wattmeters attached to the industrial machines 2. Since a technique for generating the regenerative energy to reduce the electric power peak by the control unit 32 is already known by, for example, Japanese Patent Application Laid-Open No. 2018-153041 and the like, a detailed description thereof is omitted herein.

If setting of the base speed of the servomotor 50 for peak cut is output from the machine learning device 100, the control unit 32 sets the base speed of the servomotor 50 for peak cut to that output from the machine learning device 100.

The data acquisition unit 34 is constructed so that the CPU 11 of the control device 1 shown in FIG. 1 executes the system program read out from the ROM 12 and mainly the CPU 11 performs arithmetic processing using the RAM 13 and the non-volatile memory 14 and input/output processing using the interfaces 16 and 18 and the like. The data acquisition unit 34 acquires various data from the industrial machines 2, input device 71, and the like. For example, the data acquisition unit 34 acquires control programs being executed in the individual industrial machines 2, current execution blocks in the control programs, output calculated values, output measured values, and motor speeds of the drive motors of the industrial machines 2, and the like and stores them into the acquired data storage unit 54. The data acquisition unit 34 may alternatively be configured to acquire data from an external storage device or from some other computer (not shown) through the network 5.

The preprocessing unit 36 is constructed so that the CPU 11 of the control device 1 shown in FIG. 1 executes the system program read out from the ROM 12 and mainly the CPU 11 performs the arithmetic processing using the RAM 13 and the non-volatile memory 14. The preprocessing unit 36 creates state data to be used for learning by the machine learning device 100, based on the data acquired by the data acquisition unit 34. The preprocessing unit 36 creates state data obtained by converting (by digitalization or sampling) the data acquired by the data acquisition unit 34 into a unified form dealt with in the machine learning device 100. For example, if the machine learning device 100 performs reinforcement learning, the preprocessing unit 36 creates a set of state data S and determination data D of a predetermined format in the reinforcement learning.

The state data S created by the preprocessing unit 36 include drive motor data S1 related to the drive motors of the industrial machines 2 and base speed data S2 indicative of set values of the base speed in the operating states of the industrial machines 2 indicated by the drive motor data S1.

The drive motor data S1 are defined as data indicative of the operating states of the drive motors of the industrial machines 2. The drive motor data S1 may include data indicative of current operating states of the drive motors of the industrial machines 2. Moreover, the drive motor data S1 may include the operating states of the drive motors of the industrial machines 2 during a predetermined period when and after data obtained by analyzing the control programs of the industrial machines 2 are acquired. The data indicative of the operating states of the drive motors of the industrial machines 2 may, for example, be the speeds of the drive motors of the industrial machines 2 and their displacements, output values of the drive motors calculated from the speeds and their displacements, or measured values of electric power consumed by the drive motors, measured by wattmeters or the like. The drive motor data S1 may include time-series data on the speeds, output values, and power consumption values.

The base speed data S2 are data indicative of set values of the base speed of the servomotor 50 for peak cut in the operating states of the industrial machines 2 indicated by the drive motor data S1. At the start of the operation of the control device 1, a base speed set by the control program 52 or a base speed set in the setting area of the non-volatile memory 14 should only be used for the base speed data S2. Moreover, after the base speed is set based on a set value of the base speed output from the machine learning device 100, it is necessary only that the set base speed value be used directly as the base speed data S2.

The determination data D created by the preprocessing unit 36 are data to be used for determination (or evaluation) of the adequacy of the setting of the base speed indicated by the base speed data S2 with the power consumption indicated by the drive motor data S1. The determination data D include at least peak-cut operation determination data D1 indicative of the sufficiency of peak-cut operation for the power consumption by the industrial machines and operation cost determination data D2 related to the operation cost of the servomotor 50 for peak cut.

The peak-cut operation determination data D1 may, for example, be a value indicative of the extent of peak cut achieved by decelerating the servomotor 50 for peak cut when the power consumption in the industrial machines 2 is increased. For example, the peak-cut operation determination data D1 may be the ratio of the amount of regenerative power generated by the servomotor 50 for peak cut to the amount of power consumption generated in the industrial machines 2. Moreover, peak-cut operation determination data D1 may be the amount of electric power supplied from a common power source to the power supply path when the amount of power consumption generated in the industrial machines 2 is increased. In other words, data that can determine the appropriateness of the peak-cut operation should only be used for the peak-cut operation determination data D1.

The operation cost determination data D2 may, for example, be a value indicative of the base speed of the servomotor 50 for peak cut itself. In other words, data that can determine the lowness of the base speed at which the servomotor 50 for peak cut is actually operated should only be used for the operation cost determination data D2.

The learning unit 110 is constructed so that the processor 101 of the control device 1 shown in FIG. 1 executes the system program read out from the ROM 102 and mainly the processor 101 performs arithmetic processing using the RAM 103 and the non-volatile memory 104. The learning unit 110 performs machine learning using the data created by the preprocessing unit 36. The learning unit 110 generates a learning model having learned a setting action for the base speed of the servomotor 50 for peak cut, relative to the operating states of the drive motors of the industrial machines 2 by the known method of reinforcement learning, and stores the generated learning model into the learning model storage unit 130. The reinforcement learning is a method in which a cycle such that the current state (or input) of an environment in which an object of learning exists is observed, a predetermined action (or output) is executed in the current state, and some rewards are given to the action concerned is iterated by trial and error, and such a policy as to maximize the sum total of the rewards (the setting action for the base speed of the servomotor 50 for peak cut of the present invention) is learned as a more appropriate solution. The Q-learning or the like can be given as an example of the reinforcement learning method performed by the learning unit 110.

As for a reward R in the Q-learning by the learning unit 110, if the supply of the regenerative power generated in the servomotor 50 for peak cut is sufficient (at a ratio of 1.0 or more) with respect to the power consumption in the industrial machines 2, for example, the reward R is determined to be "conforming" and regarded as a positive reward R. In contrast, if the supply of the regenerative power generated in the servomotor 50 for peak cut is insufficient (at a ratio of less than 1.0) with respect to the power consumption in the industrial machines 2, the reward R is determined to be "non-conforming" and regarded as a negative reward R. Moreover, the reward R may be determined to be "conforming" and regarded as a positive reward R if the base speed of the servomotor 50 for peak cut is successfully set lower than a predetermined threshold, for example. Furthermore, the reward R may be determined to be "non-conforming" and regarded as a negative reward R if the base speed of the servomotor 50 for peak cut is set higher than the predetermined threshold. The value of the reward R may be one that varies depending on the level of the ratio or the size of the difference from the threshold.

In the Q-learning by the learning unit 110, an action value table in which the state data S, determination data D, and rewards R are organized in association with an action value (e.g., numerical value) represented by a function Q can be used as a learning model. In this case, if the learning unit 110 performs learning, then it will update the action value table. At the start of the Q-learning, the correlation between the current environmental state and the setting of the base speed of the servomotor 50 for peak cut is unknown. Therefore, a variety of the state data S, determination data D, and rewards R are prepared in association with the value of the action-value function Q determined at random in the action value table. In advancing the learning, the value of the action-value function Q is rewritten to update the action value table, based on the state data S, determination data D, and calculated rewards R. By iterating this update, the value of the action-value function Q displayed on the action value table is sequentially rewritten so that the more appropriate the action, the greater the value is. When the learning is fully advanced, a more appropriate setting action for the base speed of the servomotor 50 for peak cut relative to the current state becomes selectable by only referring to the action value table.

The learning unit 110 may be constructed so as to use a neural network as the value function Q (learning model), input the state data S and an action a to the neural network, and output the value (result y) of the action a in the state concerned. If the learning unit 110 is constructed in this manner, a neural network comprising three layers; input, intermediate, and output, may be used as the learning model. More effective learning and inference can be performed by using the so-called deep learning method based on a neural network composed of three or more layers as an alternative method. The learning model generated by the learning unit 110 is stored into the learning model storage unit 130 on the non-volatile memory 104 and used for decision processing for the setting action for the base speed of the servomotor 50 for peak cut by the decision making unit 120.

The learning unit 110 is an indispensable structure in the stage of learning. After the learning of the setting action for the base speed of the servomotor 50 for peak cut by the decision making unit 120 is completed, however, the learning unit 110 is not necessarily indispensable. For example, the learning unit 110 may be removed when the machine learning device 100 for which the learning is completed is to be shipped to a customer or the like.

The decision making unit 120 is implemented as the processor 101 of the control device 1 shown in FIG. 1 executes the system program read out from the ROM 102 and mainly the processor 101 performs the arithmetic processing using the RAM 103 and the non-volatile memory 104. The decision making unit 120 obtains a more appropriate solution for the setting action for the base speed of the servomotor 50 for peak cut using the learning model stored in the learning model storage unit 130, based on the state data S input from the preprocessing unit 36, and outputs the obtained setting action for the base speed of the servomotor 50 for peak cut. The decision making unit 120 of the present embodiment can calculate rewards for the case in which the action concerned is taken in the current state by inputting the state data S (drive motor data S1, etc.) input from the preprocessing unit 36 and the setting action for the base speed of the servomotor 50 for peak cut as input data to the learning model (for which a parameter is set) generated by the reinforcement learning by the learning unit 110. This reward calculation is performed for the currently feasible setting action for the base speed of the servomotor 50 for peak cut, and a plurality of calculated rewards are compared to settle, as a more appropriate solution, the setting action for the base speed of the servomotor 50 for peak cut for which the highest reward is calculated. The more appropriate solution for the setting action for the base speed of the servomotor 50 for peak cut settled by the decision making unit 120 is output to the control unit 32 and used to set the base speed, and in addition, may be used for display output to the display device 70 or transmission output to a host computer, cloud computer, or the like through a wired/wireless network (not shown).

In the control device 1 having the structure described above, the operating states of the industrial machines 2 are observed as the setting of the base speed of the servomotor 50 for peak cut is changed. Thereupon, the regenerative power can be appropriately generated by decelerating the servomotor 50 for peak cut when the power consumption in the individual industrial machines is increased. Moreover, if the regenerative power is not very necessary in the future operating states of the industrial machines 2, the base speed of the servomotor 50 for peak cut is dynamically set lower. Therefore, as compared with the conventional case in which the base speed used to be fixedly set, power losses in the servomotor 50 for peak cut can be suppressed or the life of the servomotor 50 can be extended.

The following is a description of a control system according to a second embodiment in which the control device 1 is implemented as a computer, such as a fog computer or a cloud server.

Figure 4:
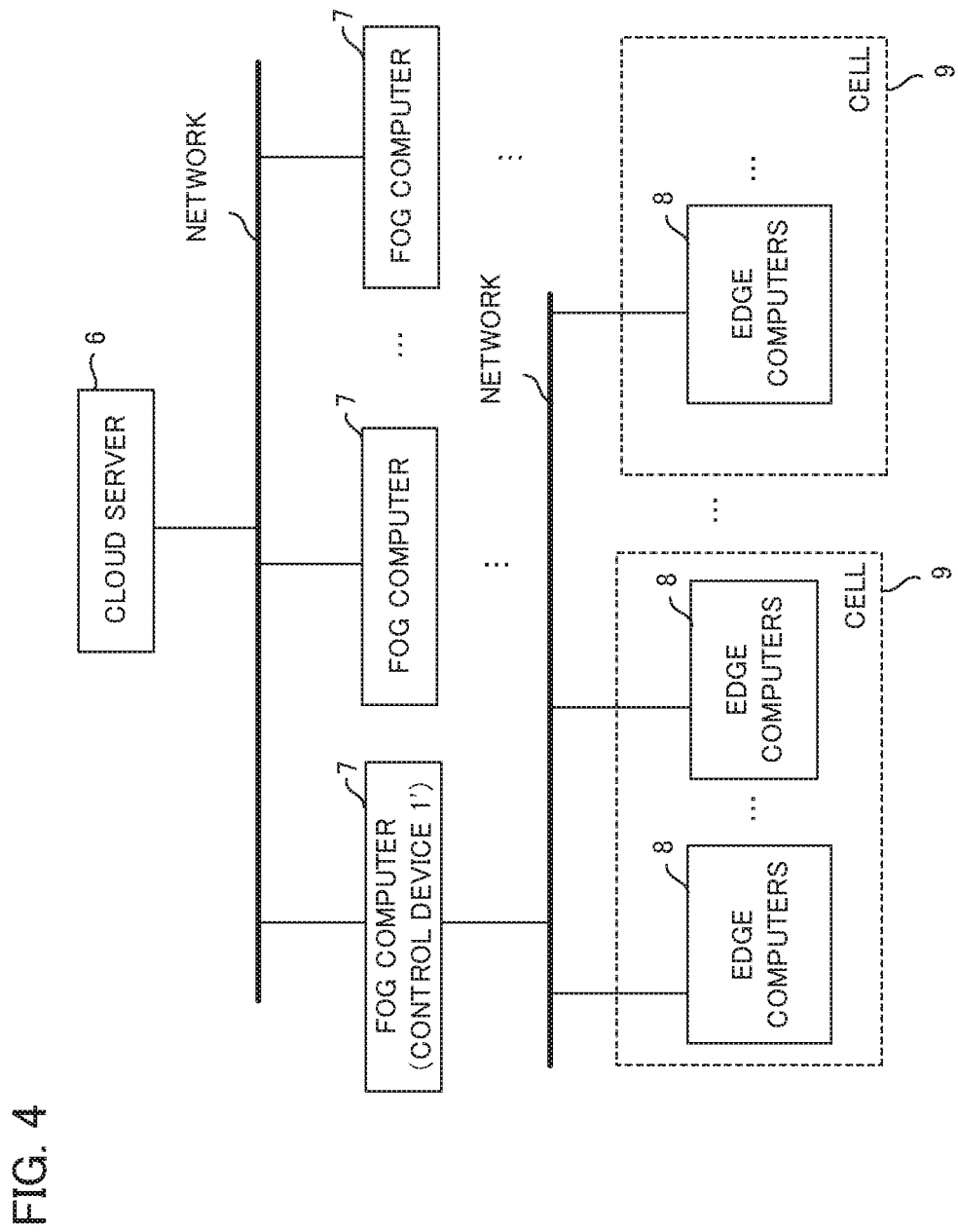
FIG. 4 is a diagram schematically showing an operation environment of a control system according to one embodiment.

FIG. 4 is a diagram showing an environment in which the control system according to the second embodiment operates. As illustrated in FIG. 4, the control system according to the present embodiment operates in such an environment that a plurality of devices including a cloud server 6, fog computers 7, and edge computers 8 are individually connected to a wired/wireless network. The system illustrated in FIG. 4 is constructed so that it is logically divided into three layers; a layer including the cloud server 6 and the like, a layer including the fog computers 7 and the like, and a layer including the edge computers 8 (robot controllers for controlling robots included in cells 9, control devices for controlling machine tools, peripheral machines such as transfer machines, power supply equipment, etc.) and the like. On such a system, the control system according to the present embodiment is constructed by implementing the function of the control device 1 described in connection with the first embodiment on computers such as the cloud server 6 and the fog computers 7. In the control system according to the second embodiment, data are mutually shared by the individual devices through the network or various data acquired by the edge computers 8 are collected in the fog computers 7 and the cloud server 6, and subjected to a large-scale analysis. Moreover, the control system enables control of the operation of each edge computer 8 based on the result of the analysis. In the system illustrated in FIG. 4, a plurality of cells 9 are provided in a factory in each place (e.g., one cell 9 is provided on each floor of a factory), and the fog computers 7 in the upper layer manage the individual cells 9 in predetermined units (e.g., for each factory or in units of a plurality of factories of one and the same manufacturer). These data collected and analyzed by the fog computers 7 are subjected to collection, analysis, and the like by the cloud server 6 in the further upper layer. Resulting information can be used for control in each edge computer 8 and the like.

Figure 5:
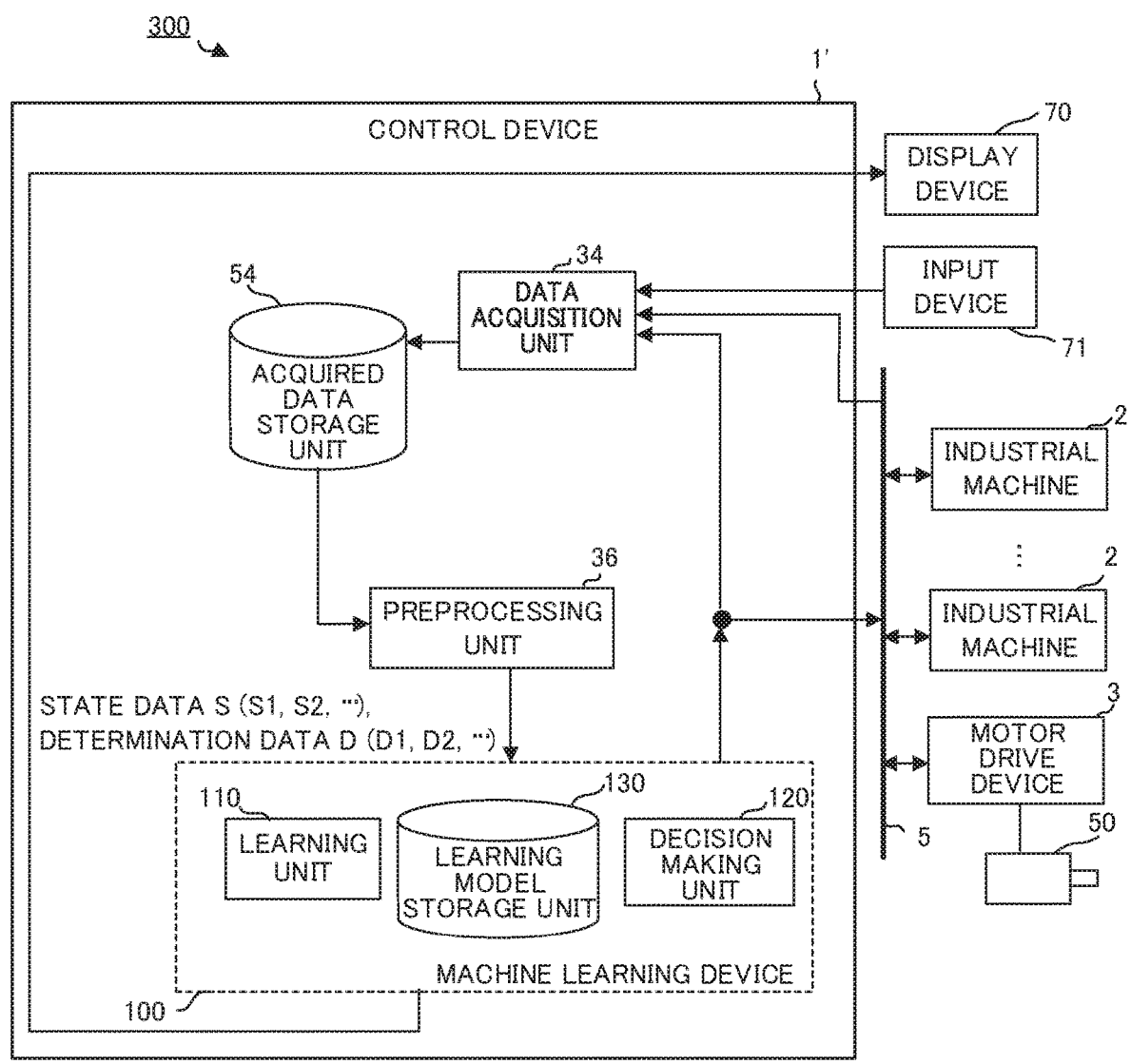
FIG. 5 is a schematic functional block diagram of a control system according to a second embodiment.

FIG. 5 is a schematic configuration diagram of the control system according to the present embodiment. A control system 300 according to the present embodiment comprises a control device 1' implemented on a computer such as the cloud server 6 or the fog computer 7, a plurality of industrial machines 2 as edge computers connected to the control device 1' through the network 5, a motor drive device 3 for controlling the operation of the servomotor 50 for peak cut, and the like. The control device 1' of the control system 300 according to the present embodiment has the same structure as the control device 1 described with reference to FIG. 2 except that it is not provided with the control unit 32.

A conventional motor drive device that can control the operation of a servomotor and exchange data with another device through a network should only be used for the motor drive device 3 for controlling the operation of the servomotor 50 for peak cut. The motor drive device 3 performs conventional peak-cut operation control for the servomotor 50 for peak cut in accordance with the states of power consumption in the industrial machines 2 acquired through the network. Moreover, when setting of a base speed is commanded from the control device 1' through the network 5, the motor drive device 3 changes the base speed in the peak-cut operation.

In the control system 300 according to the present embodiment, the control device 1' sets the base speed for the motor drive device 3. The machine learning device 100 of the control device 1' learns the operating states of the industrial machines 2 under control and the way of setting the base speed of the servomotor 50 for peak cut that enable a reasonable peak-cut operation. Thereupon, a more appropriate solution for the base speed setting can be output and set for the operating states of the industrial machines 2.

Figure 6:
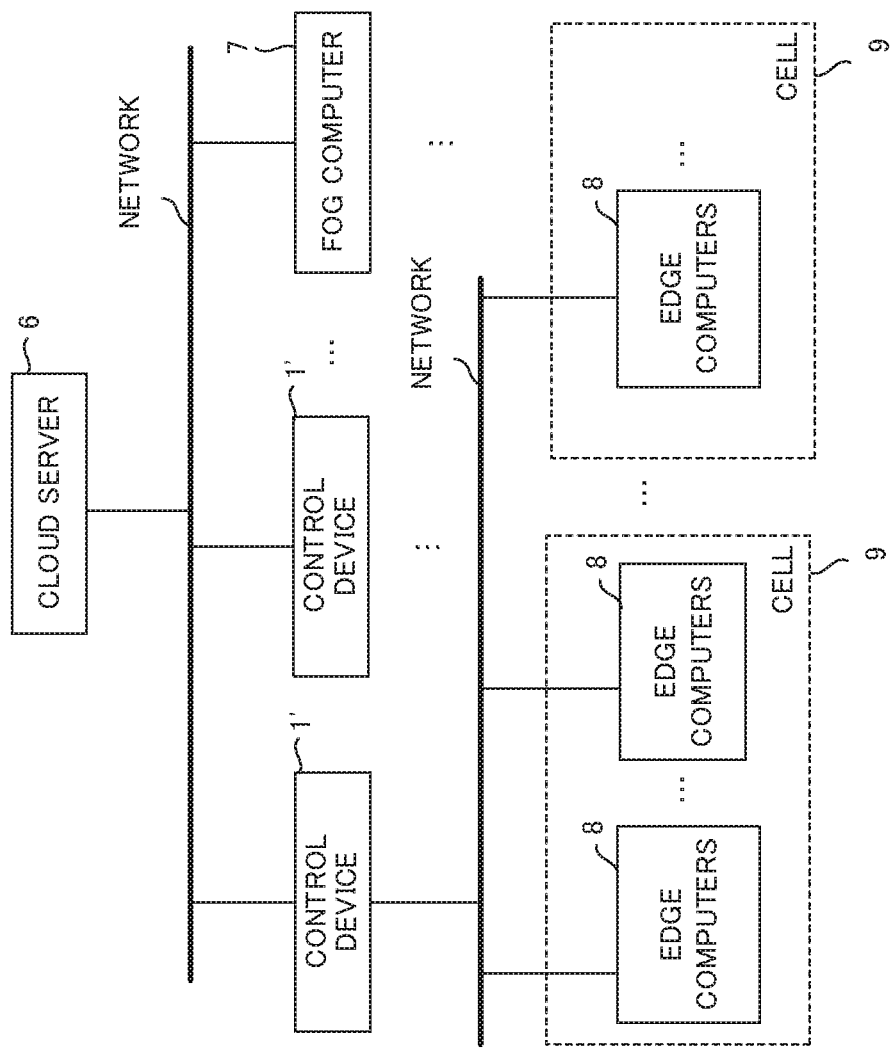
FIG. 6 is a diagram schematically showing a system in which a plurality of control systems operate.
Figure 7:
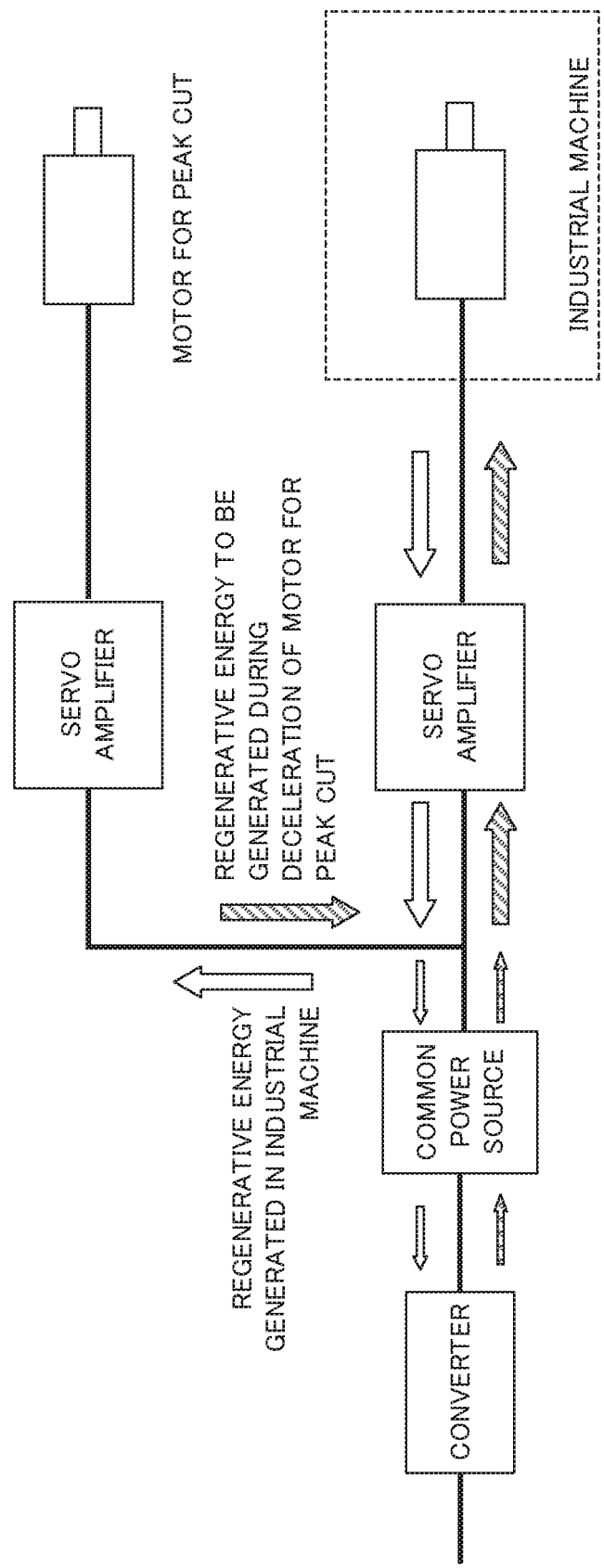
FIG. 7 is a diagram illustrating a mechanism for reducing power consumption using a prior art motor for peak cut.

FIG. 6 shows an example of introduction of a plurality of control systems 300 into the system environment shown in FIG. 4. The system illustrated in FIG. 6 comprises a plurality of control systems 300 (not shown) in which control devices 1' are implemented on the fog computers 7. Each of the control devices 1' manages a plurality of edge computers 8 and performs learning based on data collected from the industrial machines (edge computers 8) under control. Each control device 1' is constructed so that it can mutually exchange a learning model as a result of its learning with another control device 1', directly or through the cloud server 6.

Each control system 300 constructed in this manner can acquire and use a learning model from another control system 300 in which industrial machines similar to the ones under control, for example, are disposed. Thus, when a new factory is installed or the like, the labor for experimental operational work for learning model construction at the startup of the factory can be considerably saved by diverting the learning model from the control system 300 operated by a combination of similar industrial machines.

While embodiments of the present invention have been described above, the invention is not limited to the examples of the above-described embodiments and may be suitably modified and embodied in various forms.

For example, while the control device 1 and the machine learning device 100 are described as devices comprising different CPUs (processors) in the embodiments described above, the machine learning device 100 may be implemented by the CPU 11 of the control device 1 and the system programs stored in the ROM 12.

The invention claimed is:

1. A control device configured to control a peak-cut operation of a motor for peak cut connected to one and the same power supply path with at least one industrial machine, the control device comprising:
    a data acquisition unit configured to acquire data on at least an operating state of the industrial machine;
    a learning model storage unit configured to store a learning model in which the value of a setting action for a base speed of the motor for peak cut is associated with the operating state of the industrial machine; and
    a decision making unit configured to settle the setting action for the base speed of the motor for peak cut based on the data on the operating state of the industrial machine acquired by the data acquisition unit, by using the learning model stored in the learning model storage unit, wherein regenerative power is generated by decelerating the motor for peak cut.

2. The control device according to claim 1, wherein the data acquisition unit further acquires data on the base speed of the motor for peak cut, and the control device comprises a learning unit configured to generate a learning model in which the setting action for the base speed of the motor for peak cut is associated with the operating state of the industrial machine.

3. The control device according to claim 2, wherein the learning unit identifies a positive reward if supply of regenerative power from the motor for peak cut is sufficient for electric power consumed in the industrial machine or if the set base speed of the motor for peak cut is low and identifies a negative reward if the supply of the regenerative power from the motor for peak cut is insufficient for the electric power consumed in the industrial machine or if the set base speed of the motor for peak cut is high, and the learning unit generates the learning model based on the value of the reward concerned.

4. The control device according to claim 1, wherein the learning model is an action value table stored with the value of the setting action for the base speed of the motor for peak cut in association with the operating state of the industrial machine.

5. The control device according to claim 1, wherein the learning model is a neural network formed of a multi-layer structure.

6. A control system in which a plurality of the control devices according to claim 2 are connected to one another, the control system being configured so that the result of learning by the learning unit is sharable by the control devices.

7. A machine learning device having learned a setting action for a base speed of a motor for peak cut, connected to one and the same power supply path with at least one industrial machine, in control of a peak-cut operation of the motor for peak cut, the machine learning device comprising:
  a learning model storage unit configured to store a learning model in which the value of a setting action for a base speed of the motor for peak cut is associated with an operating state of the industrial machine; and
  a decision making unit configured to settle the setting action for the base speed of the motor for peak cut based on the data on the operating state of the industrial machine by using the learning model stored in the learning model storage unit,
  wherein regenerative power is generated by decelerating the motor for peak cut.

8. The machine learning device according to claim 7, further comprising a learning unit configured to generate a learning model in which the setting action for the base speed of the motor for peak cut is associated with the operating state of the industrial machine.

* * * * *